United States Patent [19]
Sheller

[11] Patent Number: 5,272,876
[45] Date of Patent: Dec. 28, 1993

[54] CORE ELEMENT FOR CATALYTIC CONVERTER

[75] Inventor: David T. Sheller, Garrettsville, Ohio

[73] Assignee: W. R. Grace & Co.-Conn., New York, N.Y.

[21] Appl. No.: 886,009

[22] Filed: May 20, 1992

[51] Int. Cl.5 ............................................. F01N 3/28
[52] U.S. Cl. ...................................... 60/300; 60/303; 422/174; 422/180
[58] Field of Search .................. 60/300, 303; 422/174, 422/180

[56] References Cited

U.S. PATENT DOCUMENTS 5,118,475 6/1992 Cornelison ............................ 60/300

Primary Examiner—Douglas Hart
Attorney, Agent, or Firm—Edward J. Cabic

[57] ABSTRACT

There is provided a novel and improved core element for a catalytic converter characterized in that the core element has a corrugated thin metal strip with bent tab members at each end, such tab members being in two portions. These two portion sandwich the ends of the corrugated thin metal strip therebetween and provide a convenient means for welding the ends of the corrugated thin metal strip to the tab members. A plurality of such corrugated strips with the tab members attached are tightly spirally wound about a central post or pin and the tab members are dimensioned to overlap and ultimately define a shell segment. The shell segments define a core which is encased in a suitable housing to form a catalytic converter which may be electrically heatable. An electrically heatable catalytic converter is especially useful to remove pollutants from internal combustion engine exhaust gas.

23 Claims, 4 Drawing Sheets

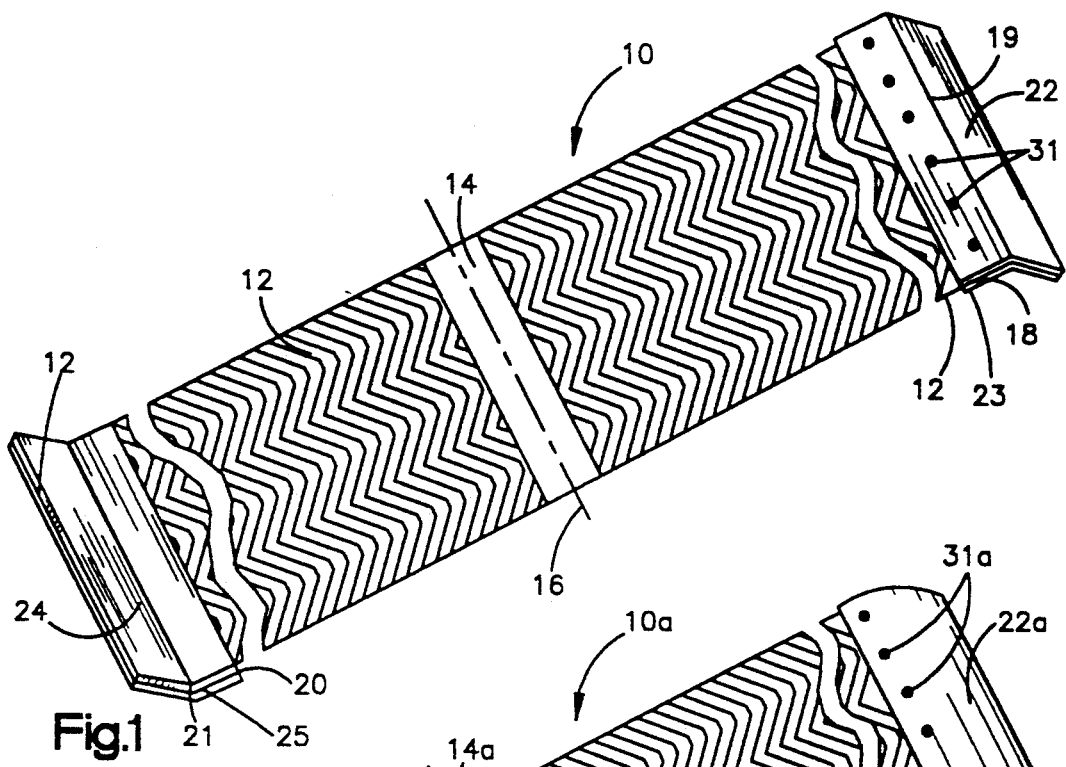
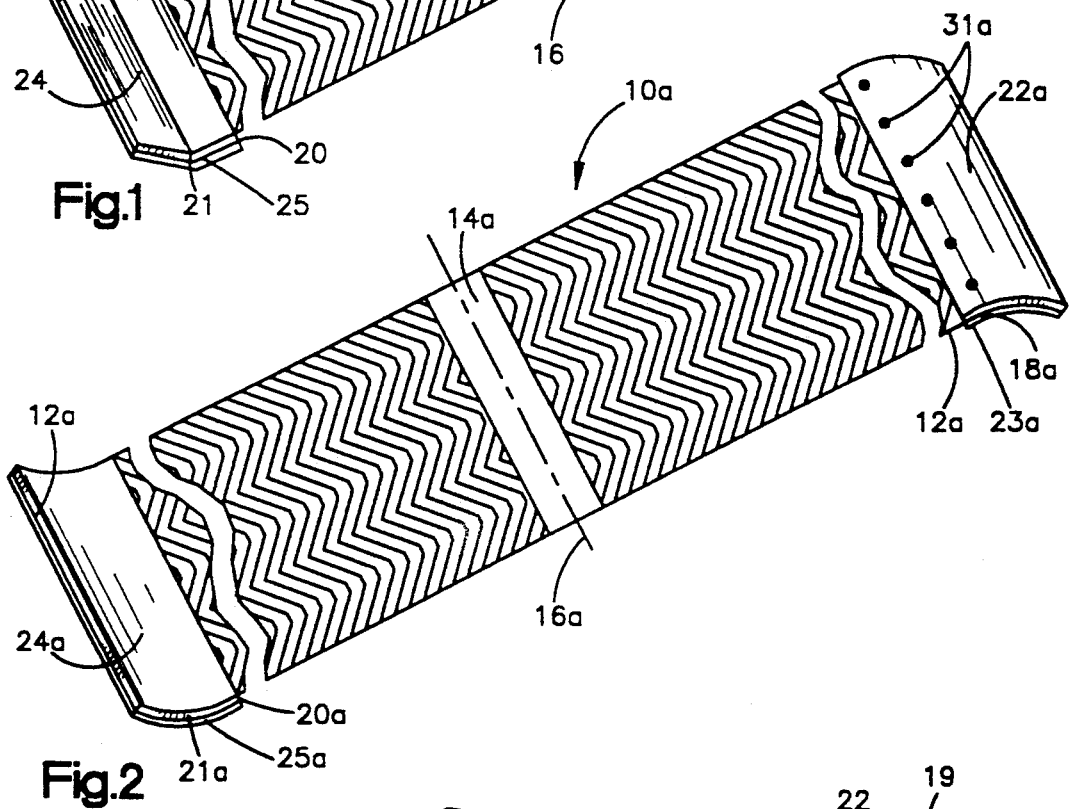
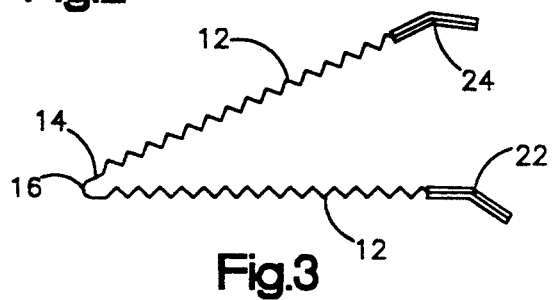
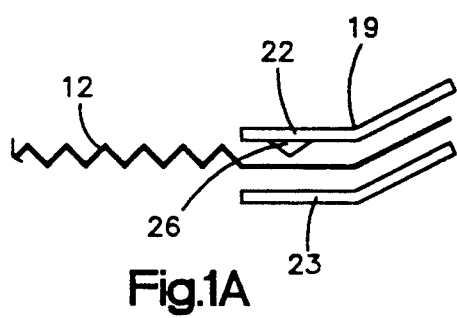

CORE ELEMENT FOR CATALYTIC CONVERTER

This invention relates to a novel core element for a catalytic converter, and especially to a core element for an electrically heatable catalytic converter. The invention also relates to an electrically heatable catalytic converter containing a core utilizing a plurality of such core elements.

BACKGROUND OF THE INVENTION AND PRIOR ART

The purpose of a catalytic converter for an internal combustion engine or a gas turbine is to convert pollutant materials in the exhaust, e.g., carbon monoxide, unburned hydrocarbons, nitrogen oxides, etc., to carbon dioxide, nitrogen and water. Conventional catalytic converters utilize a ceramic honeycomb monolith having square or triangular, straight-through openings or cells with catalyst deposited on the walls of the cells; catalyst coated refractory metal oxide beads or pellets, e.g., alumina beads; or a corrugated thin metal foil monolith, e.g., a ferritic stainless steel foil or a nickel alloy foil, having a catalyst carried on or supported on the surface. The catalyst is normally a noble metal, e.g., platinum, palladium, rhodium, ruthenium, or a mixture of two or more of such metals, and or zeolite catalysts. The catalyst catalyzes a chemical reaction, mainly oxidation, whereby the pollutant is converted to a harmless by-product which then passes through the exhaust system to the atmosphere.

However, conversion to such harmless by-products is not efficient initially when the exhaust gases are relatively cold. To be effective at a high conversion rate, the catalyst and the surface of the converter with which the gases come in contact must be at or above a minimum temperature e g., 390° F. for carbon monoxide, 570° F. for volatile organic compounds (VOC) and 1000° F. for methane or natural gas. Otherwise, conversion to harmless by-products is poor and cold start pollution of the atmosphere is high. Once the exhaust system has reached its normal operating temperature, the catalytic converter is optimally effective. Hence, it is necessary for the relatively cold gases to make contact with a hot catalyst so as to effect satisfactory conversion. Compression ignited engines, spark ignited engines and reactors in gas turbines have this need.

To achieve initial heating of the catalyst prior to engine start-up, there is conveniently provided an electrically heatable catalytic converter, preferably one formed of a thin metal monolith, either flat thin metal strips, straight corrugated thin metal strips, pattern corrugated thin metal strips, (e.g., herringbone or chevron corrugated) or variable pitch corrugated thin metal strips (See U.S. Pat. No. 4,810,588 dated Mar. 7, 1989 to Bullock et al) or a combination thereof, which monolith is connected to a voltage source, e.g., a 12 volt to 108 volt, or higher, power supply, preferably at the time of engine start-up and afterwards to elevate and maintain the catalyst to at least 650° F. plus or minus 20° F. Alternatively, power may also be supplied for 2 to 10 or so seconds prior to start-up of the engine. Catalytic converters containing a corrugated thin metal (stainless steel) monolith have been known since at least the early seventies. See Kitzner U.S. Pat. Nos. 3,768,982 and 3,770,389 each dated Oct. 30, 1973. More recently, corrugated thin metal monoliths have been disclosed in U.S. Pats. No. 4,711,009 date Dec. 8, 1987; 4,381,590 to Nonnenmann et al dated May 3, 1983, and 5,070,694 dated Dec. 10, 1991 to William A. Whittenberger and entitled Electrically Heatable Catalytic Converter, commonly owned with the present application; and International PCT Publication Numbers WO 89/10470 and WO 89/10471 each filed Nov. 2, 1989. However, a common problem with any such prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at high temperature between 800° and 950° C.; 1472° to 1742° F., respectively) with exhaust gas from a running internal combustion engine simultaneously being passed through the device. If the electrically heatable catalytic device telescopes or displays separation or folding over of the leading, or upstream, edges of the foil leaves up to a predetermined time, e.g., 5 to 200 hours, the device is said to fail the test. Usually a device will fail within 5 hours if it is going to fail. Five hours is equivalent to 1.8 million cycles at 100 Hertz.

The Hot Cycling Test is conducted on a running engine at 800° to 950° C. (1472° to 1742° F.) and cycled to 120° to 150° C. once every 15 to 20 minutes, for 300 hours. Telescoping or separation of the leading edges of the foil strips is considered a failure.

The Hot Shake Test and the Hot Cycling Test, hereinafter called "Hot Tests", have proved very difficult to survive, and many efforts to provide a successful device have been either too costly or ineffective for a variety of reasons.

Previously tested samples of EHC's in automotive service and comprised entirely of heater strips in electrical parallel, did not have adequate endurance in Hot Tests or did they satisfy the need for lower power ratings. In repeated efforts to arrive at a suitable design sing purely parallel circuit construction, samples were made and tested with a wide range of parameters, including a length-to-diameter aspect ratio of from 0.5 to 1.5, cell densities of from 100 to 500 cells per square inch, individual strip heaters as long as 15 inches, and parallel circuits limited to as few as 2 heater strips.

Devices made according to these parameters proved unsatisfactory in the Hot Tests because (a) terminal resistance was too low and therefore, the device drew too much power, (b) a relatively high voltage differential between laminations associated with small numbers of parallel heater strips caused some arcing and, (c) Hot Tests could not be passed consistently. With regard to (c), EHC's with heater strips longer than about 7" measured from the center of the core to the outside of the core have generally not passed the Hot Shake Test. Resistance that is too low causes one or more of the following problems: (a) the weight and size of the battery become unacceptably high and/or expensive; and (b) the EHC has to be made so large in diameter that longer heater strips have to be used which induces a tendency to fail the Hot Tests. The devices were, of course, useful in less stringent environments.

Prior structures, such as that described in U.S. Pat. No. 4,928,485 dated May 29, 1990 to Whittenberger, have had all of the corrugated thin metal heater strip members connected in a manner such that all of the strips extended spirally outwardly from a central electrode to a circular shell which served as the electrode of opposite polarity. The strips served as heaters for the core. However, power levels of less than 2.0 kilowatts at 7 volts when measured at the EHC terminals could not be achieved when all of the heater strips were in parallel because the terminal resistance of the EHC was too low.

In the following description, reference will be made to "ferritic stainless steel." A suitable formulation for ferritic stainless steel alloy is described in U.S. Pat. No. 4,414,023 to Aggen dated Nov. 8, 1983. A specific ferritic stainless steel useful herein contains 20% chromium, 5% aluminum, and from 0.002% to 0.05% of at least one rare earth metal selected from cerium, lanthanum, neodymium, yttrium and praseodymium, or a mixture of two or more of such rare earth metals, balance iron and trace steel making impurities. Another metal alloy especially useful herein is identified as Haynes 214 which is commercially available. This alloy is described in U.S. Pat. No. 4,671,931 dated Jun. 9, 1987 to Herchenroeder et al. Haynes 214 is characterized by high resistance to corrosion. A specific example contains 75% nickel, 16% chromium, 4.5% aluminum, 3% iron, trace amounts of one or more rare earth metals, 0.05% carbon, and steel making impurities. Ferritic stainless steel and Haynes 214 are examples of high temperature resistive, corrosion resistant metal alloys useful herein. Suitable alloys must be able to withstand temperatures of 900° C. to 1100° C. over prolonged periods.

Other high temperature resistive, corrosion resistant metal alloys are known and may be used herein. The thickness of the metal foil heater strips should be in the range of from 0.001" to 0.003", preferably 0.001" to 0.002". The two alloys mentioned above have been found most satisfactory for use in the present invention, especially Haynes 214.

In the following description, reference will also be made to fibrous ceramic mat, woven ceramic fiber tape, or insulation. Reference may be had to U.S. Pat. Nos. 3,795,524 dated Mar. 5, 1974 to Sowman and 3,916,057 to Hatch dated Oct. 28, 1975 for formulations and manufacture of ceramic fibers and mats useful herein. One such ceramic fiber material is currently available from 3-M under the registered trademark "NEXTEL" 312 Woven Tape and is especially useful herein. Ceramic fiber mat is available as "INTERAM" also from 3-M.

It is a principal object of the present invention to provide a core element which enables simplified, less costly manufacture of a core useful in a catalytic converter.

BRIEF STATEMENT OF THE INVENTION

Briefly stated, the present invention is a core element for a catalytic converter, especially an electrically heatable catalytic converter, which core element comprises a corrugated thin metal strip having oppositely directed bent metal tab members secured to each end of said strip, said tab members being bent along one or more lines normal to the edges of the corrugated thin metal strip. Where there are an infinite number of lines along which the tab member is uniformly angularly bent, the result is a segment of a circle, and both tab members have the same radius of curvature. In preferred embodiments, the tab members have the same "width" (length) as the corrugated thin metal strip. Also in preferred embodiments, the thin metal strip has a transversely extending flat portion in the middle of the strip. The tab members hereof have upper and lower portions sandwiching the corrugated thin metal strip therebetween. One of said portions is provided with at least one welding point, and usually up to 6 such welding points. These points are generally conical in shape and are adapted to weld to the corrugated thin metal foil strip and bond to the other portion in a pressing and welding operation whereby a sandwich with the upper and lower tab portions and the corrugated thin metal foil is formed.

BRIEF DESCRIPTION OF THE DRAWINGS

The invention may be better understood by having reference to the annexed drawings showing preferred embodiments of the present invention, and illustrating the manner of making a catalytic converter core therefrom, and wherein:

FIG. 1 is a perspective view of a core element in accordance with the present invention and illustrates the best mode of practicing the invention known to me at the present time.

FIG. 1a is a diagrammatic side illustration of the core element of FIG. 1 showing the upper and lower portions of the tab member and the sandwiching of the corrugated thin metal strip therebetween.

FIG. 2 is a perspective view of another core element in accordance with the present invention having arcuate tab members.

FIG. 3 is an end view of the core element of FIG. 1 folded in half along a transverse line bisecting the flat central portion of the corrugated thin metal strip.

DETAILED DESCRIPTION OF THE DRAWINGS

Figure 4:
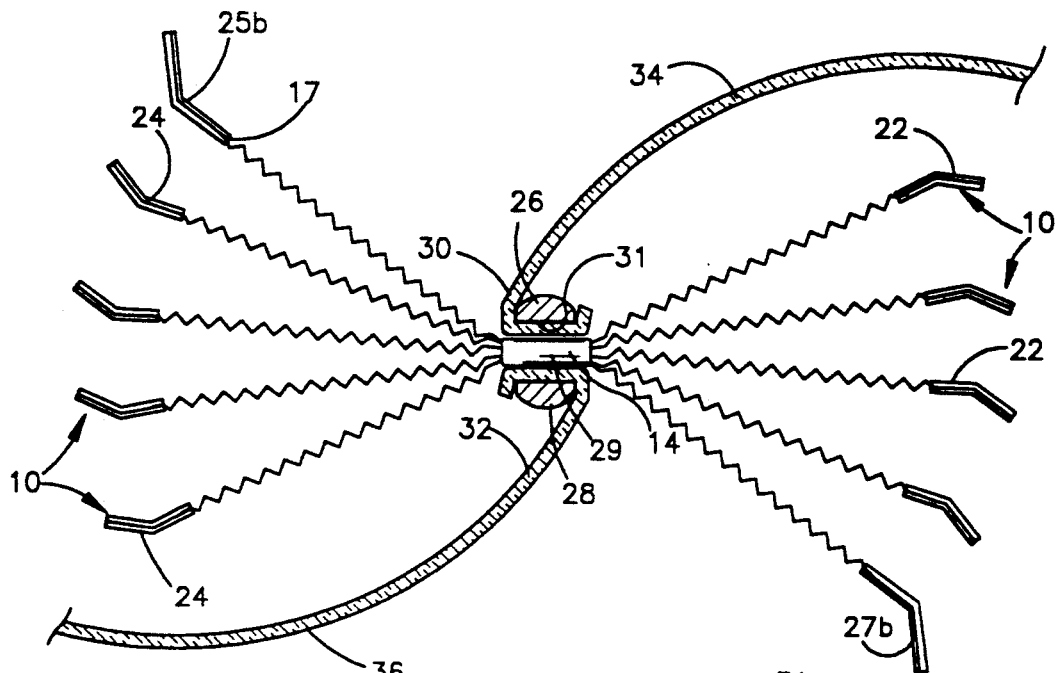
FIG. 4 is a view of a core in accordance herewith with angularly bent tab members.

As indicated above, the present invention is a novel core element especially useful in an electrically heatable catalytic converter. The core elements are strips of thin corrugated high temperature resistive, oxidation resistant thin metal alloy strips having oppositely directed bent metal tab members at each end. By "thin" is meant 0.0015" to about 0.005". A distinguishing feature of the core elements of the present invention is that the tab members have two portions which sandwich therebetween the end of the corrugated thin metal strip. A further distinguishing feature is that the tab member portions with the corrugated thin metal strips sandwiched therebetween have a part thereof displaced out of the plane of the tab member as hereinafter explained; and these tab members when the thin metal strips to which they are attached are tightly spirally wound about a central post or pin, overlap and define a segmented generally circular retainer shell about the core elements. A series of tab members when welded together as shown, for example, in FIGS. 6 and 7, define an electricity conductive connector for a plurality of heater strips connected in parallel, there being at least two such electricity conductive segments in a given core. There may be more than two such spaced electricity conductive segments of corrugated thin metal strips in a given core. All such segments are spaced from each other and connected in series with the voltage source.

The tab members are partially overlapped and when welded together define a generally circular segment, two or more such segments forming a generally circular body. The thin foil strips are corrugated, desirably in a herringbone pattern, so that contiguous spiral convolutions do not nest and thus blind the core to the passage of exhaust gas therethrough. This feature of the herringbone pattern eliminates the need for alternate flat metal strips. Other nonnesting patterns for the corrugations may be used, e.g., variable pitch corrugations. The structure of the core elements hereof enables a simplified manufacture for the core which lends itself to a continuous manufacturing process. The cores hereof, when included in a suitable housing, have been found to survive the "Hot Tests" described above.

Referring now, more particularly, to the drawings, FIG. 1 is the best mode of carrying out this invention presently known to me, and shows a core element 10 in accordance with the present invention. The core element 10 is formed from a strip of thin, e.g., 0.002" thick, high temperature resistive, oxidation resistant metal alloy 12, such as, Haynes 214, or a ferritic stainless steel. The strips may be continuously corrugated and coated with a thin coating of a refractory metal oxide, for example 0.0002" to 0.0015" thick, and at least one overlay catalyst metal, by a process such as described in U.S. Pat. No. 4,711,009, supra. In using the foregoing process, final steps including creasing and accordion folding are omitted; cutting the precoated strip to a predetermined length, flattening the middle portion and the ends, and wire brushing the coating from the ends are steps which may be added to the process. Alternatively, the finished corrugated strip may be stamped and then coated with a refractory metal oxide coating, e.g., alumina, titania, alumina/ceria, titania/alumina, titania/ceria, magnesia/zirconia, etc. A preferred refractory metal oxide composition is 75% gamma alumina/25% ceria. The coating may be applied by wash coating followed by calcining, or by plasma spray. A noble metal catalyst, e.g., platinum/rhodium mixed catalyst, is then applied to the coated surface from an aqueous solution and calcined. The strip as shown in FIG. 1 is provided with a herringbone corrugation pattern. This pattern provides a mixed flow of the exhaust gas along a zig-zag path from inlet to outlet. A straight-through flow follows an axial path straight through from inlet to outlet.

The strip 12 is provided with a flat portion 14 spanning the center line 16. This is conveniently done by flattening the center portion of a pre-coated, pre-catalyzed corrugated strip as above indicated. Alternatively, a flat mid-portion can be created by selectively not corrugating what is to be the flat mid-portion of the strip. The flat portion is from $\frac{1}{8}$th" to $\frac{7}{8}$" wide, e.g., $\frac{3}{8}$ths". The ends 18 and 20 of the strip 12 may be flattened and wire brushed to remove refractory metal oxide coating to facilitate welding of the strip to the tab members.

Figure 6:
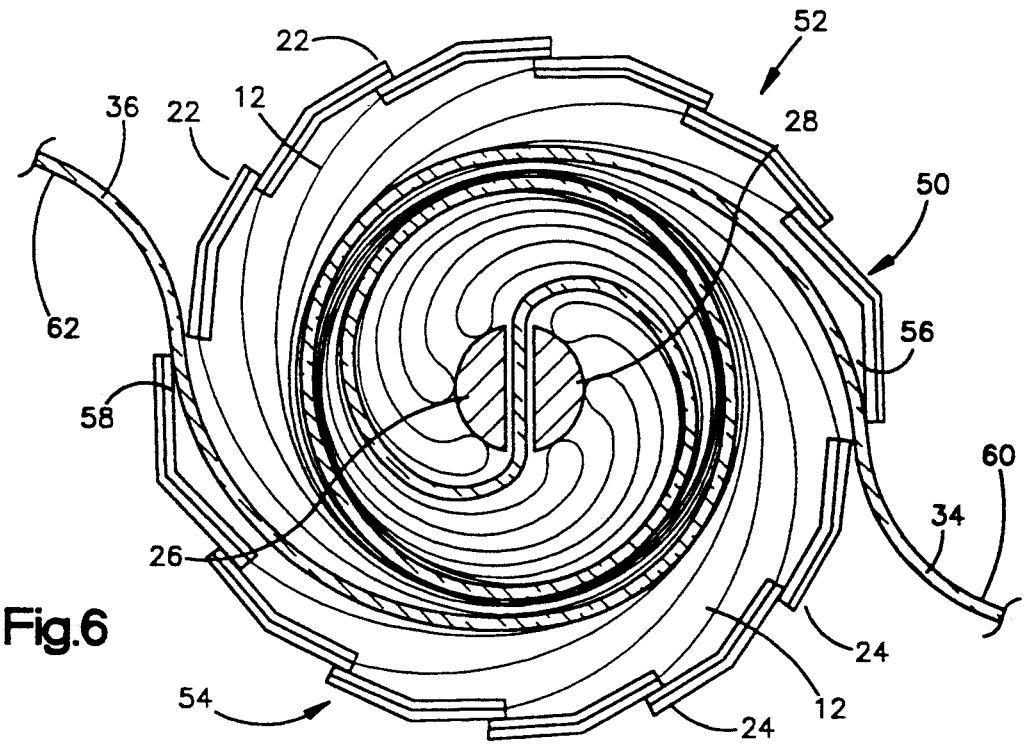
FIG. 6 is an end view of a spirally wound core composed of a plurality of core elements, such as shown in FIG. 1 and showing the overlapping of the core element tab members to form a segmented retaining shell and with woven ceramic fiber tapes extended externally of the retaining shell.
Figure 7:
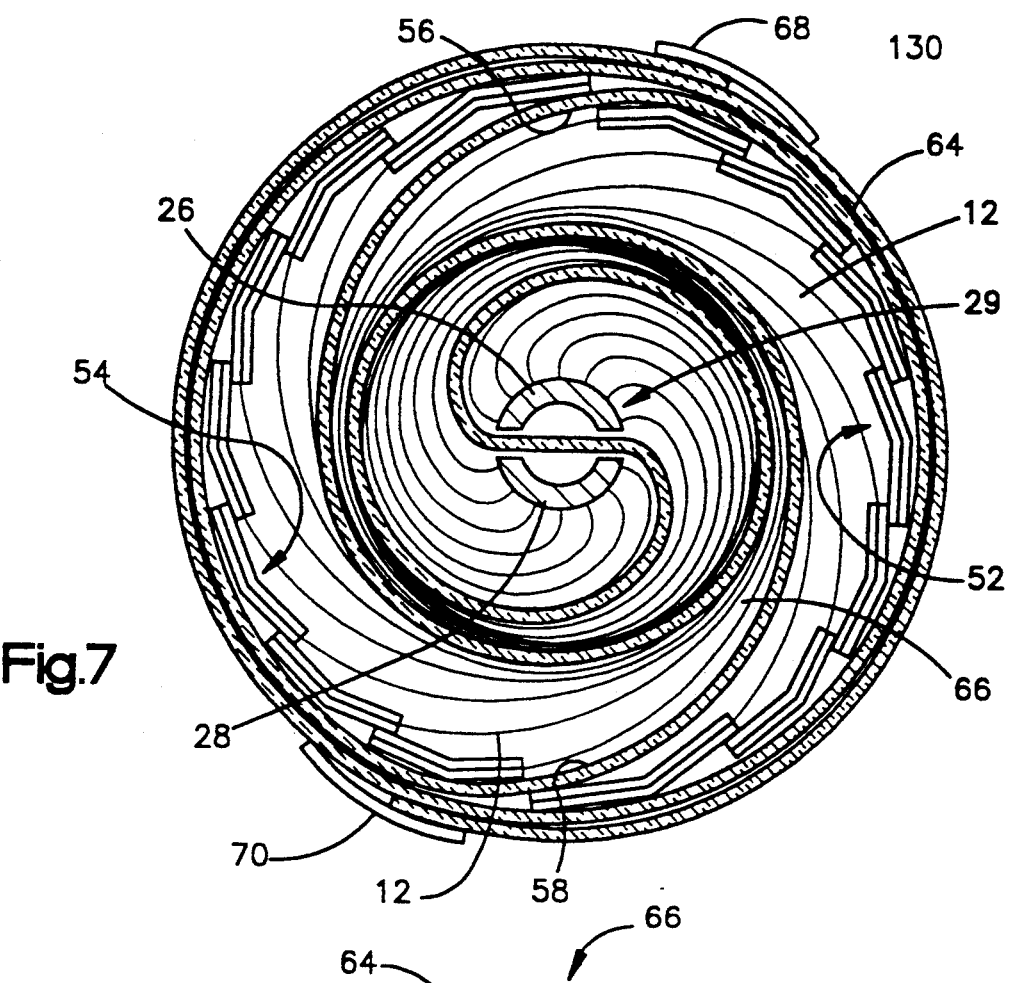
FIG. 7 is an end view of a core of the present invention with woven ceramic fiber tapes wound about the overlapped tab members prior to circumferentially weldin the tab members to form the retaining shell.

Tab members 22 and 24 are angularly bent along a single transverse line 19 from about 15 to about 35 degrees, preferably about 26 degrees, out of the plane of the tab member. The tab members may be bent along more than one line, e.g., two to ten lines, for example, up to an infinite number of longitudinal lines to form a circular arc as described in my copending application Ser. No. 880,082, filed May 4, 1992 and entitled Core Element for Catalytic Converter, which application is commonly owned with the present application. The bend line 19 (FIG. 5) is preferably midway between the longitudinal edges of the tab member, although displacement from the longitudinal centerline up to as much as 0.2" may occur. The tab members 22-23 and 24-25 are secured to the ends 18 and 20 of the corrugated thin metal strip, one tab member being in a concave position (24-25) and the other being in a convex position (22-23) relative to the surface of the strip 12. Thus, when the corrugated strips 12 are folded along the centerline 16, as shown, for example in FIG. 3, or spirally wound as shown in FIGS. 6 and 7, the tab members 22-23 and 24-25 overlap incompletely because of the longer path one corrugated part of the strip 12 must follow with respect to the other part of the corrugated strip 12. Usually six or seven strips 12 are used. Tab members 25b and 27b are longer in an circumferential direction (with respect to the spirally wound core element) than tab members 22-23 and 24-25 in FIG. 1. Such longer tab members 25b and 27b are located so as to be diametrically opposed when the core is spirally wound. In the positions shown in FIG. 4, tab members 25b and 27b provide sufficient surface for stud welding a terminal, e.g., terminals 28 and 31 in FIG. 9. The terminals 28 and 31 may be $\frac{3}{8}$" diameter nickel.

In specific embodiments, the corrugated strip 12 from end to end is 13.5" long, 1.72" wide by 0.0020 thick. The corrugations are herringbone pattern and have an amplitude of from 0.02" to 0.09", e.g., 0.025", and a pitch of from 0.08" to 0.18" e.g., 0.126". The cross-sectional shape of the corrugations may be triangular, truncated triangular, triangular with the apices rounded (preferred), wave-like, e.g., sinusoidal, etc. The pattern is desirably herringbone or chevron, with sides having a slope of from 3 degrees to 20 degrees, e.g., 16 degrees, to a line perpendicular to the longitudinal edges of the thin metal alloy strip. Alternatively, for lower pressure drop through the catalytic converter, the pattern of corrugations may be regular and straight-through corrugations backed up with a flat strip, or straight-through with a variable pitch, such as described in U.S. Pat. No. 4,810,588 dated Mar. 7, 1989 to Bullock et al. The preferred herringbone corrugated thin metal strips shown in FIG. 1, and used herein do not require being backed up with a flat thin metal strip to prevent nesting, which would increase cost. This latter expedient may be used, however, if desired.

The tab members 22-23 and 24-25 (FIG. 1) have two portions, the upper portion 22 and the lower portion 23 of tab member 22-23, and the upper portion 24 and the lower portion 25 of the tab member 24-25. The end 18 of the corrugated thin metal strip 12 is sandwiched between the upper portion 22 and the lower portion 23 of tab member 22-23, and the end 20 of the corrugated thin metal strip 12 is sandwiched between the upper portion 24 and the lower portion 25 of tab member 24-25. It is convenient, albeit not essential, that the corrugated thin metal strip 12 extend to the outer extremities of the tab members 22–23 and 24–25 The ends of the corrugated thin metal strip 12 may be flattened prior to or during the sandwiching operation. Upper tab members 22 and 24 are provided with welding points 31. From 2 to 10, e.g., 6 such welding points may be provided along a longitudinal line on the upper tab member portion, for example, upper portion 22. These welding points 31 are conical in shape with a diameter of about 0.09" and about 1/32" high. They are adapted to weld to the corrugated thin metal foil strip and bond to the lower portion 23, for example. By this means, the upper portion 22 and the lower portion 23 are welded together and tightly grip the end of the corrugated thin metal strip 12. In like the tab member 24–25 is attached to and tightly grips the opposite end of the corrugated thin metal strip 12.

The upper and lower portions are each 0.007" to about 0.03" thick, e.g., 0.015" thick. Both portions 22 and 23, for example, are bent along a central longitudinal line 19 and an angle of from 15 to 35 degrees, e.g., 26 degrees, out of the plane of the tab member 22. In like manner, the tab member 24 is mounted in the opposite direction so that the tab member 22–23 is convex and the tab member 24–25 is concave relative to the same surface of the corrugated thin metal strip as shown in FIG. 1.

The terminal post tab members 25b and 27b (FIG. 4) are conveniently 0.032" thick by 1.25" by 1.72". The ultimate degree of bending of the free edge of the tab member out of the plane of the tab member, or the radius of curvature, depends on the ultimate diameter of the catalytic converter core. Longitudinal elements of the tab member, e.g., tab member 22–23, may be angularly displaced out of the plane of the tab member along any one or more longitudinal elements of the tab member body, e.g., a single line or a plurality of lines, or continuously along any arc, e.g., circular, parabolic, hyperbolic, elliptic, etc. In a specific embodiment, the diameter of the core is approximately 2 inches. The tab member material is metal, for example, a stainless steel, e.g., #409 Stainless steel, a total of about 0.035" thick. The arcuate tab members 22a–23a and 24a–25a, for example, subtend an arc of from 10 degrees to 45 degrees, and overlap from 1/10th to ⅜ths of their width. The radius may be from 0.75" to 6.0" or more. Twelve narrower tab members 22–23 and 24–25, and two wider tab members are required for a seven strip core.

FIG. 4 shows a cross-sectional view of a core in accordance herewith prior to spirally winding the core elements 10, only five of which are shown. There may be any number of core elements 10 from two to eighteen, e.g., four, six, seven, eight, ten, or more. In FIG. 4 the flat portions 14 are gathered and inserted in a gap 31 between the legs 26 and 28 of a rigid central pin which is conveniently shaped like a cotter pin. The refractory metal oxide coating and catalyst on the foil strip 12 does not have to be removed from the central flat portion 14. Legs 26 and 28 are desirably the bifurcated legs of a cotter pin shaped central post or pin. Prior to inserting the core elements 10, the legs 26 and 28 are covered with a flexible woven ceramic sleeve 30 and 32, respectively, formed at the end of each of the flexible woven ceramic tape strips 34 and 36. The flexible woven ceramic strips 34 and 36 are, in a specific embodiment, 1.22" wide and 8.37" long. The legs 26 and 28 are thus insulated from contact with the foil strips 12. The woven ceramic tape strips 34 and 36 may be quite long so that they can be wrapped spirally around the final assembly of the core to insulate the core from the housing as discussed below in connection with FIG. 9. The woven ceramic tape strips 34 and 36 have a width less than the width of the foil strips 12 and are generally from 0.75 to 2" wide, e.g., 1.5" wide. This allows space at each end of the tab member for welding the tab members to form partial retaining shell as described below. A separate woven ceramic strip 29 is desirably wrapped around the gathered flattened midsections 14 of the strips 12.

Figure 5:
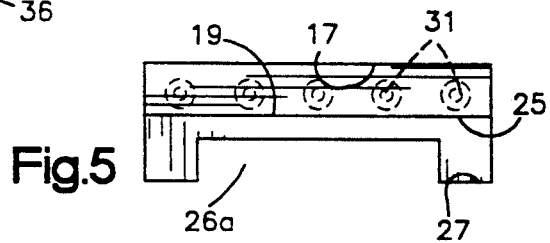
FIG. 5 is a plan view of an angularly bent tab member like that shown in FIG. 1 having a notch in the free end to allow passage of an insulation strip.

FIG. 5 shows in plan view a modified form of a tab member, e.g., tab member 25b in FIG. 4. Here, there is a notch 26a in the free edge 27. The notch 26a enables the passage of a woven ceramic tape strip, e.g., woven ceramic tape strip 36 in FIG. 4, to the exterior of the core. The width of the notch 26a is from 0.025" to about 0.1" in FIG. 5. Welding points 31 are shown in FIG. 5.

Prior to inserting the core into the housing 120 (FIG. 9), the core may be held together by means of clamps or, conveniently, a 0.02" diameter wire serves to retain the woven ceramic tape strips, e.g., 34 and 36 in FIG. 4 in place through final insertion into the housing 120. The assembled EHC is electrically tested and, when connected to a power source, the 0.02" wire fixture is destroyed because of the short circuit created around the O.D. of the core. With the removal of the 0.02" diameter wire tie, the core becomes supported and retained by the woven ceramic tape and the housing 120.

FIG. 6 shows an end view of a spirally wound core 130 (FIG. 9) using a split pin with legs 26 and 28, such as shown in FIG. 4. When a structure, such as that shown in FIG. 4, is spirally wound about the legs 26 and 28, the tab members 22–23 and 24–25 of the several core elements 10 become arranged in overlapping relation as shown. The woven ceramic fiber tapes 34 and 36 are simultaneously spirally wound with the core elements 10, and because of their much greater length separate the partial shell parts 52 and 54 at the gaps 56 and 58 and extend well beyond. The woven ceramic tapes 34 and 36 also serve the important function of electrically isolating groups of core elements 10 from one another. The tail portions 60 and 62 are of sufficient length to provide, in a preferred case, a double layer 64 (FIG. 7) of woven ceramic fiber tape insulation over the outside of the shell parts 52 and 54. The thickness of the insulation leyer is from about ⅛" to about ⅜" and serves to isolate electrically the spirally wound core 66 from the housing as later described. When the core elements 10 have been fully spirally wound about the central pin or post 29, the ends of the elongated tails 60 and 62 (FIG. 4) of the woven ceramic fiber tapes 34 and 36 are taped with a suitable adhesive tape, e.g., adhesive tape portions 68 and 70. Duct tape may be used for this purpose. The shell segments 52 and 54 are connected in series to the voltage source, e.g., a battery. The plural core elements 10 are connected in parallel between the shell segments 52 and 54. If, for example, there were four shell segments (such as segments 52 and 54 although of lesser circular arc, for example) each of the segments would subtend arcs of less than 90 degrees and be connected in series with each other through the core elements 10 and in series with the voltage source.

Figure 8:
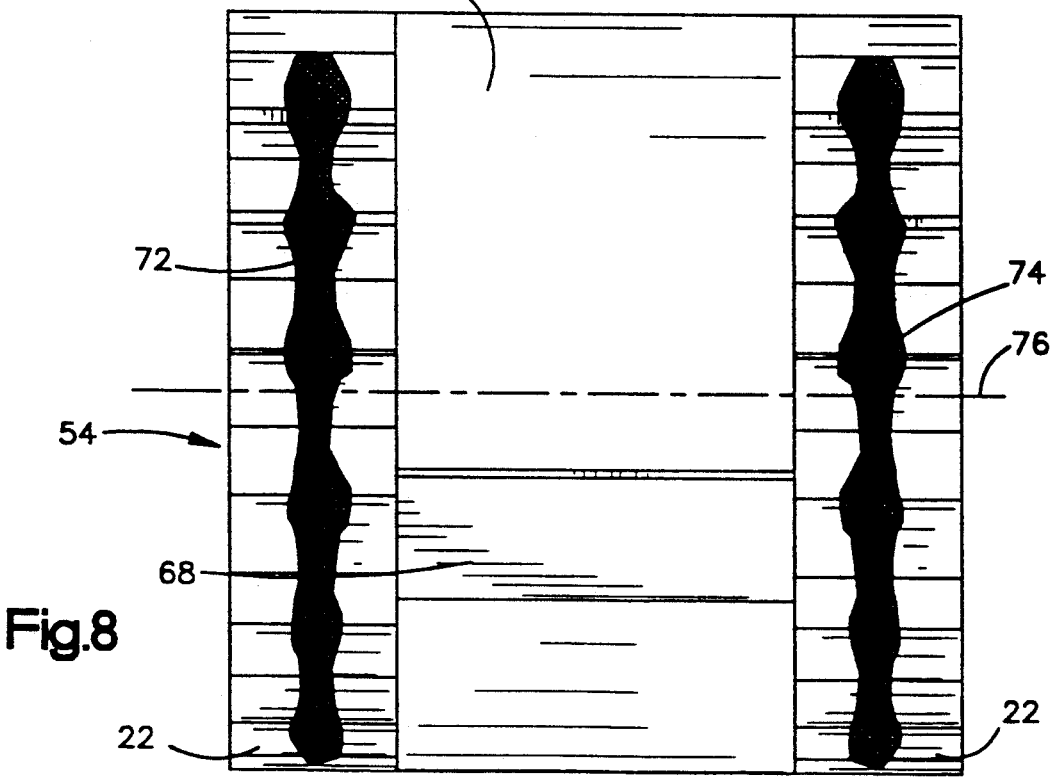
FIG. 8 is a side view of a completed catalytic converter core showing the weldments for the tab members and the woven ceramic fiber tape for insulating the core from the housing.

As shown in FIG. 8, the visible ends of the tab members, e.g., the tab members 22–23 which are in overlapping relation, are welded together along axially spaced generally circumferential lines 72 and 74, e.g., by MIG (metal-inert gas) or TIG, (tungsten-inert gas) welding, so that the tab members, e.g., 22-23, and the tab members 24-25 (not shown in FIG. 8 form, respectively, rigid, electricity conductive shell portions 52 and 54 (FIG. 6), shell portion 52 not being shown in FIG. 8. The woven ceramic tape layer 64 and an adhesive tape portion 68 are shown in FIG. 8. The center-line 76 denotes the axis of the core 66.

Figure 9:
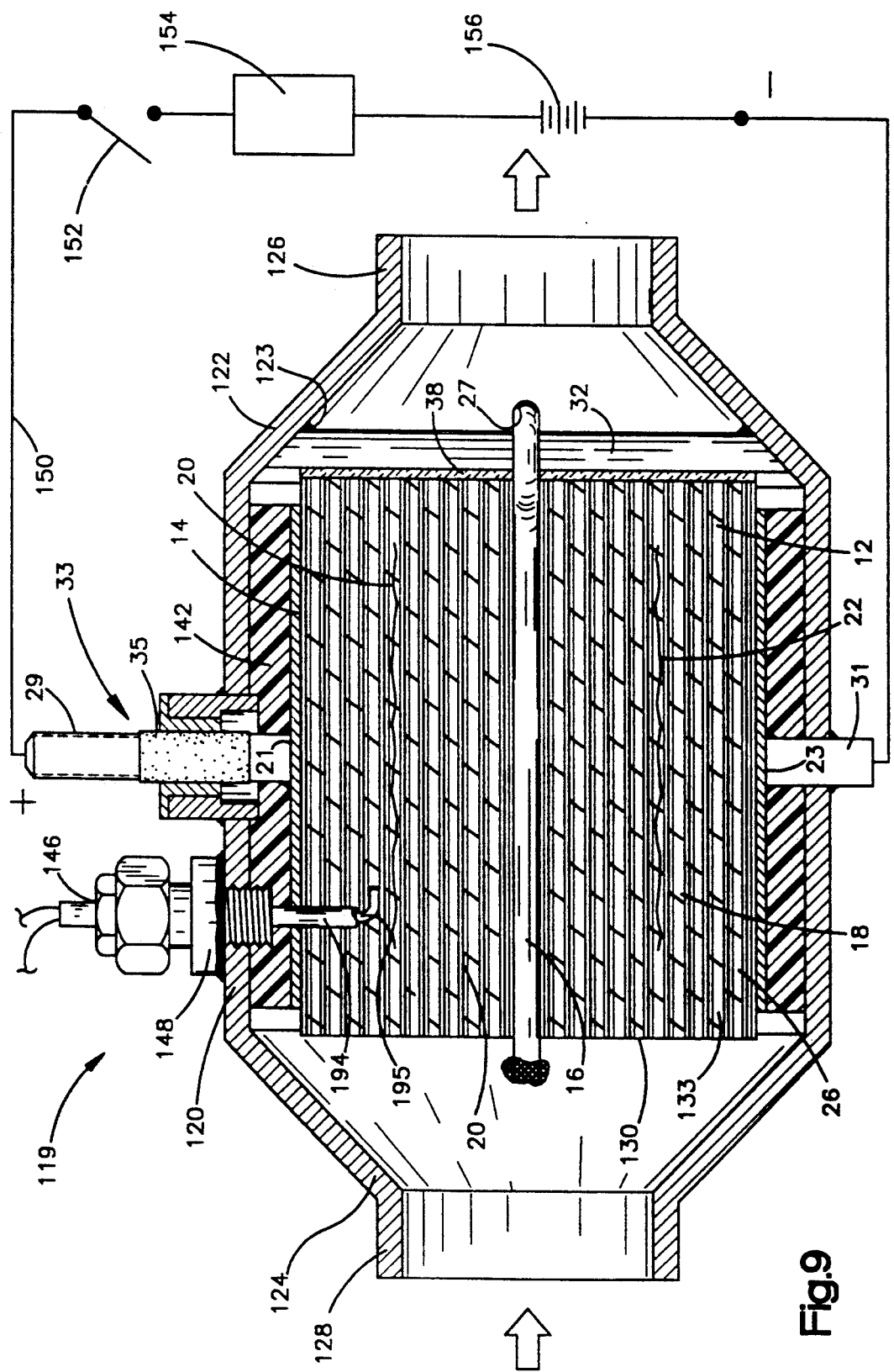
FIG. 9 is a cross sectional view of an electrically heatable catalytic converter utilizing core elements of the present invention.

FIG. 9 shows in cross-section an electrically heatable catalytic converter generally indicated at 119 utilizing a core 130 in accordance with the present invention. This assembly is ready for insertion in the exhaust line of an internal combustion engine. The converter 119 is provided with a housing 120 formed of stainless steel, e.g., #304 or #409 stainless steel, or alloy metal, having flared end caps 122 and 124, and nipples 126 and 128 integral therewith. The nipples 126 and 128 are dimensioned to accommodate a vehicle exhaust pipe, e.g., a 2.5" ID pipe. The housing 120 contains an electrically heatable core 130, e.g., that shown in FIG. 8 utilizing core elements 10 such as shown in FIG. 1. The core 130 defines a plurality of generally axially extending cells 133, diagrammatically shown in FIG. 9 as a plurality of parallel lines. As indicated above, the shell segments 52 and 54 are electrically isolated from each other. The core 130 is permeable to exhaust gas with the flow being indicated by the arrows at the inlet end and the outlet end. The core 130 is formed of a plurality of corrugated thin high temperature resistive, corrosion resistant metal alloy strips 12 (See FIG. 1). The middle portions of the thin metal heater strips 12 are gripped by the legs 26 and 28 of the central post or pin 26/28 along with insulation strips 34 and 36. In the embodiment shown in FIG. 9, the central post or pin 26/28 is in the form of a cotter pin and has an eye 27 which surrounds a diametrally extending bar 32 having a plasma applied coating of 38 to insulate the bar 32 from the ends of the core elements 10 (FIG. 1) at the downstream end of the core, and aids in preventing telescoping of the core 130. The bar 32 is welded at its extremities to the end cap 122. The legs 26 and 28 form a couple which facilitates spiral winding of the core 130. The terminals 28 and 31 extend through the housing 120 and are suitably connected to a power source 156 through a suitable power switching device 154 (see Ser. No. 587,219 filed Sep. 24, 1990 by W. A. Whittenberger et al) by cable 150 and switch 152. The insulation layer 142, formed as indicated above, electrically isolates the core 130 from the housing 120. At the time the housing half shells (which is the most convenient way of surrounding the core 130 with the housing 120) are applied and the insulation 142 in place, it is desirable to cement very thin foil sections to the outer surface of the insulation 142 in the region where the half shells mate. This is to prevent ceramic fibers from the insulation layer 142 from being pinched between edges of the half shells of the housing 120. These foil sections serve no other purpose in the devices hereof.

The end caps 122 and 124 are the last parts to be attached as by seam welding. Optionally, a thermocouple 194 having a Junction 195 may be placed in the core 130 to sense temperature. The leads of the thermocouple pass through an insulator 146, preferably a ceramic sleeve 146, and a bushing 148 extending through the housing 120. The projecting stud 29 of the terminal generally indicated at 33 is desirably threaded to accept a pair of nuts (not shown) to hold a standard cable connector from cable 150 extending from the positive pole of a battery 156 as above indicated. The negative pole of the battery 156, which may be a 12 volt, 24 volt, or 48 volt battery, for example, may be attached to the terminal 31, or indirectly attached to the terminal 31 through the chassis of the vehicle which, in turn is attached to the battery 156 by a conventional ground strap.

The cell density of the core 130 is conveniently in the range of from 80 to 350 cells per square inch, preferably 100 to 180 cells per square inch, and in a specific embodiment 160 cells per square inch.

While the catalytic converters hereof may be used without electrical heating, or without the associated electrical connections, terminals and insulators, the preferred embodiments are "electrically heatable." Power is supplied on demand from the time of engine start-up and/or prior to engine start-up, or at any time the catalyst is under its predetermined set point temperature.

There has thus been provided a novel and improved core element for a catalytic converter, and particularly for an electrically heatable catalytic converter characterized in that the core element has bent end tab members, bent along one line as shown in FIG. 1, or along more than one ling, e.g., the arc of a circle, such tab members being in two portions. These portions sandwich the ends of the corrugated thin metal strips therebetween and provide a convenient means of welding the ends of the thin metal strip to the tab members. A plurality of corrugated thin metal strips are tightly spirally wound about a central post or pin, and the tab members are dimensioned to overlap and ultimately define a shell segment. The core elements hereof enable simplified manufacture amenable to automation. There has also been provided an electrically heatable catalytic converter characterized by the novel core elements hereof.

What is claimed is:

1. A core element for a catalytic converter comprising in combination a corrugated thin metal strip and a tab member at at least one end of said corrugated thin metal strip extending longitudinally along the end of the metal strip with shorter edges of said tabs extending away from the strip, said tab member sandwiching said corrugated thin metal strip between upper and lower portions thereof, and said tab member being angularly bent along one or more lines lying longitudinally of the tab member and generally normal to the shorter edge.

2. A core element for a catalytic converter as defined in claim 1 wherein the tabs are bent at an angle of from about 15 degrees to about 35 degrees along a single centrally located line lying longitudinally of the tab.

3. A core element for a catalytic converter as defined in claim 1 wherein the tab member is bent along an infinite number of lines lying longitudinally of the tab to form a segment of a circle including from 10 degrees to 45 degrees of arc.

4. A core element for a catalytic converter as defined in claim 1 wherein at least one of the upper and lower portions of the tab member includes a welding point of sufficient length to weld to the corrugated thin metal and bond to the other portion of the tab member.

5. A core element as defined in claim 4 wherein at least one of the upper and lower portions of the tab member includes a plurality of welding points.

6. A core element for a catalytic converter as defined in claim 1 wherein the upper and lower portions of the tab are separate pieces.

7. A core element for a catalytic converter as defined in claim 1 wherein the upper and lower portions of the tab are joined along a fold line.

8. A core element for a catalytic converter as defined in claim 1 wherein the corrugated thin metal strip has a tab member at each end thereof.

9. A core element for a catalytic converter as defined in claim 1 wherein the corrugated thin metal strip is corrugated in a herringbone pattern.

10. A core element for a catalytic converter as defined in claim 1 wherein the corrugated thin metal strip is a nickel/chromium/aluminum/iron alloy.

11. A core element for a catalytic converter as defined in claim 1 wherein the corrugated thin metal strip is a ferritic stainless steel.

12. A core element for a catalytic converter as defined in claim 8 wherein one tab member has a greater width than the other.

13. A core element for a catalytic converter as defined in claim 1 wherein the corrugated thin metal strip has a centrally located flat portion.

14. A core element for a catalytic converter as defined in claim 1 wherein the corrugated thin metal strip has a coating of a refractory metal oxide on at least one side thereof.

15. A core element as defined in claim 14 wherein the refractory metal oxide comprises alumina.

16. A core element as defined in claim 14 wherein the refractory metal oxide is an alumina/ceria mixture.

17. A core element as defined in claim 14 wherein the refractory metal oxide is a magnesia/zirconia mixture.

18. A core element for a catalytic converter as defined in clam 1 wherein the corrugated thin metal strip includes a catalyst on the surface thereof.

19. A core element as defined in claim 18 wherein the catalyst is a noble metal catalyst.

20. A core element as defined in claim 19 wherein the noble metal catalyst is selected from the group consisting of palladium, platinum, rhodium, ruthenium and mixtures of two or more such metals.

21. A core for a catalytic converter comprising a bifurcated central pin, a plurality of corrugated thin metal strips each having oppositely directed bent tab members secured to the ends thereof/, respectively, said tab members being generally rectangular in shape and extending longitudinally along the end of the metal strip with shorter edges of said tab members extending away from the strip, and each tab member having upper and lower portions sandwiching said corrugated thin metal strip therebetween, each of said tab members being angularly bent along one or more lines lying longitudinally of the tab member and generally normal to the shorter edges, said strips being located between the legs of said bifurcated pin whereby the tab members are in partially overlapped relation, and means for securing said tab members in such partially overlapped relation, and said secured partially overlapped tab members defining at least two electrically isolated generally circular segments.

22. A core as defined in claim 21 including woven ceramic tape strips at least partially surrounding the legs of said bifurcated central pin and electrically isolating said corrugated thin metal strips from contact therewith.

23. An electrically heatable catalytic converter comprising (1) a housing, (2) end cap adapters for each end of the housing for adapting said converter for insertion in an exhaust line, said converter having an upstream end for contacting inlet exhaust gas containing pollutants, and a downstream end for exiting pollutant depleted exhaust gas; (3) a core for said catalytic converter having an upstream end and a downstream end and comprising (a) a bifurcated central pin, (b) a plurality of corrugated thin metal strips, each strip having (c) oppositely directed bent metal tab members secured to each end of said corrugated thin metal strips, said tab members being generally rectangular in shape and having a length greater than the width thereof, each tab member having upper and lower portions sandwiching each end of the corrugated thin metal strip therebetween, and at least one of said upper and lower portions having at least one welding point thereon, said welding point adapted to weld to the corrugated thin metal strip and bond to the other of said upper and lower portions, said tab members being bent along one or more line lying longitudinally of the tab member and generally normal to the shorter edges, said strips being located between the legs of said bifurcated pin, and said strips being spirally wound about said bifurcated pin, whereby the tab members are in partially overlapped relation; and (d) means for securing said partially overlapped tab members in such partially overlapped relation, and said secured partially overlapped tab members defining at least two electrically isolated generally circular segments, (e) a transverse bar extending across the downstream end of said core, welded to the said bifurcated central pin and in contact with the downstream end of the spirally wound corrugated thin metal strips, said bar having an insulating coating on at least one side thereof in contact with said corrugated thin metal strips; (4) insulation means between the outside of the core and the housing, (5) a feed through terminal extending through the housing secured to one of said generally circular segments and adapted to be attached to one pole of a voltage source; (6) a second terminal for attachment to the other pole of a voltage source and extending through said housing and secured to another of said generally circular segments; and (7) a voltage source.

* * * * *